(12) United States Patent
Holland et al.

(10) Patent No.: US 11,987,459 B2
(45) Date of Patent: May 21, 2024

(54) GRAVITY-DRIVEN FLOW RACK ASSEMBLIES

(71) Applicant: Toyota Motor Engineering & Manufacturing North America, Inc., Plano, TX (US)

(72) Inventors: Lloyd R. Holland, Georgetown, KY (US); Bradley J. Garcia, Louisville, KY (US); Scottie L. Foster, Lawrenceburg, KY (US); Michael C. Greenlee, Paris, KY (US); Eric F. Cornett, Georgetown, KY (US); Randall L. Johnson, Lexington, KY (US); Michael P. Meyer, Georgetown, KY (US); Steven R. Johnson, Georgetown, KY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 580 days.

(21) Appl. No.: 17/125,046

(22) Filed: Dec. 17, 2020

(65) Prior Publication Data

US 2022/0194759 A1    Jun. 23, 2022

(51) Int. Cl.
  *B65G 9/00*      (2006.01)
  *B61B 13/04*     (2006.01)
  *B62D 65/02*     (2006.01)
  *B65G 1/04*      (2006.01)
  *B65G 47/61*     (2006.01)
  (Continued)

(52) U.S. Cl.
  CPC .............. *B65G 9/008* (2013.01); *B61B 13/04* (2013.01); *B62D 65/022* (2013.01); *B65G 1/0457* (2013.01); *B65G 9/00* (2013.01); *B65G 47/61* (2013.01); *B65G 47/683* (2013.01); *B65G 69/20* (2013.01); *B29C 61/02* (2013.01); *B65G 2812/01* (2013.01)

(58) Field of Classification Search
  CPC ........ B65G 9/00; B65G 9/008; B65G 19/025; B65G 1/0457; B65G 47/61; B65G 47/683; B65G 69/20; B65G 2812/01; B62D 65/18; B62D 65/022; B61B 10/025
  See application file for complete search history.

(56) References Cited

U.S. PATENT DOCUMENTS 2,645,186 A * 7/1953 Davis .................. B61J 1/06
                                                104/162
3,491,427 A * 1/1970 Zimmerman ........... B60B 29/00
                                                428/34.1
(Continued)

FOREIGN PATENT DOCUMENTS

CN    2786141      6/2006
CN    209200174    8/2019
(Continued)

*Primary Examiner* — Zachary L Kuhfuss
(74) *Attorney, Agent, or Firm* — Dinsmore & Shohl LLP

(57) ABSTRACT

A method of transporting a vehicle engine wire harness from a component preparation location to a component pick location is provided. The method includes placing the vehicle engine wire harness on a hook of a component hanger. The component hanger with vehicle engine wire harness is directed along a supply track assembly through a heated enclosure to the component pick location at a vehicle assembly line.

15 Claims, 6 Drawing Sheets

(51) Int. Cl.
*B65G 47/68* (2006.01)
*B65G 69/20* (2006.01)
*B29C 61/02* (2006.01)

(56) References Cited

U.S. PATENT DOCUMENTS

| | | | | | |
|---|---|---|---|---|---|
| 4,615,273 | A | * | 10/1986 | Osthus | B65G 47/61 |
| | | | | | 198/465.4 |
| 4,936,223 | A | * | 6/1990 | Billings | E01B 25/24 |
| | | | | | 104/107 |
| 2011/0290620 | A1 | * | 12/2011 | O'Brien | B65G 35/08 |
| | | | | | 198/562 |

FOREIGN PATENT DOCUMENTS

| | | | | | |
|---|---|---|---|---|---|
| CN | 109177137 | B | * | 6/2020 | ............. B29C 35/06 |
| CN | 215619954 | U | * | 1/2022 | ............. B29C 61/02 |
| CN | 215643859 | U | * | 1/2022 | ........... H01B 13/012 |
| FR | 2957067 | A1 | * | 9/2011 | ................ B65G 9/00 |
| JP | H10310116 | A | * | 11/1998 | ............. B65B 53/00 |
| KR | 100964148 | | | 6/2010 | |

\* cited by examiner

GRAVITY-DRIVEN FLOW RACK ASSEMBLIES

TECHNICAL FIELD

The present specification generally relates to flow rack assemblies that are used to transfer components from one location to another and, more specifically, to flow rack assemblies that utilize gravity to supply components to an assembly line.

BACKGROUND

Flow racks are commonly used to store and/or transfer components, parts, etc. The flow racks may have a plurality of rollers so that components and/or component trays can be moved from one location to another location. Such racks can facilitate movement of the components and/or component trays from one location to another.

Plants, warehouses and other locations have their own space limitations or constraints. Flow racks may be designed to take into account such space constraints. Human factors and efficiencies may also be considered. Typical flow racks may use electrical power to drive the transfer of components.

Accordingly, a need exists for flow rack assemblies that utilize gravity to operate.

SUMMARY

In one embodiment, a method of transporting a vehicle engine wire harness from a component preparation location to a component pick location is provided. The method includes placing the vehicle engine wire harness on a hook of a component hanger. The component hanger with vehicle engine wire harness is directed along a supply track assembly through a heated enclosure to the component pick location at a vehicle assembly line.

In another embodiment, a flow rack assembly includes a supply track assembly that extends from a component preparation location to a component pick location. A transition track assembly extends from the supply track assembly to a return track assembly. The return track assembly extends from the transition track assembly to the supply location declining in elevation such that a component hanger travels along the return track assembly due to gravity. A hanger transport device moves along a track between ends of the supply track assembly and the return track assembly at the component preparation location. The hanger transport device includes a hanger support structure configured to receive the component hanger from the return track assembly at a pick-up position and transport the component hanger to the supply track assembly at a release position.

In another embodiment, a flow rack assembly includes a supply track assembly that extends through a heated enclosure from a component preparation location to a component pick location. A transition track assembly extends from the supply track assembly to a return track assembly located outside the heated enclosure. The return track assembly extends from the transition track assembly to the component preparation location declining in elevation such that a component hanger travels along the return track assembly due to gravity.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to flow rack assemblies that supply components to an assembly line in a continuous fashion. The flow rack assemblies utilize gravity to continuously supply the components on component trays without use of electrical power. The flow rack assemblies include a supply track assembly and a return track assembly. The supply track assembly feeds component hangers with components placed thereon from a component preparation location to a component pick location. The return track assembly feeds empty component hangers from the pick location back to the component preparation location. A transition track assembly is located between the supply track assembly and the return track assembly and directs the empty component hangers from the pick location to the return track assembly under the influence of gravity. Gravity is then used to deliver the empty component hanger along the return track assembly back to the component preparation location to receive another component.

Figure 1A:
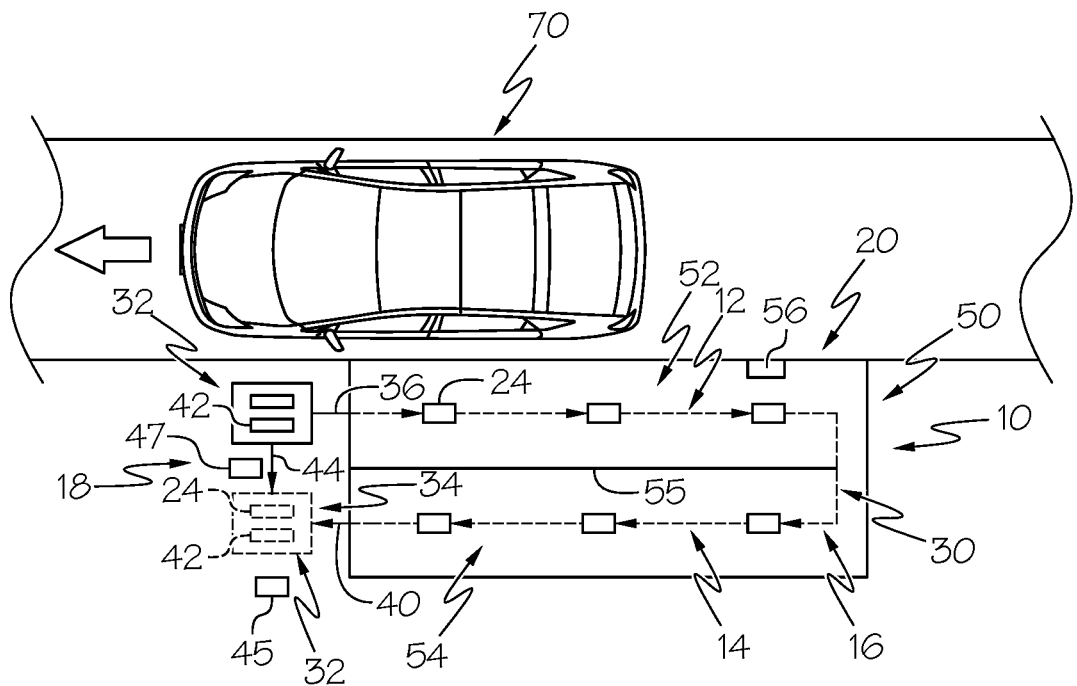
FIG. 1A is a diagrammatic top view of a gravity fed flow rack assembly, according to one or more embodiments shown and described herein.
Figure 1B:
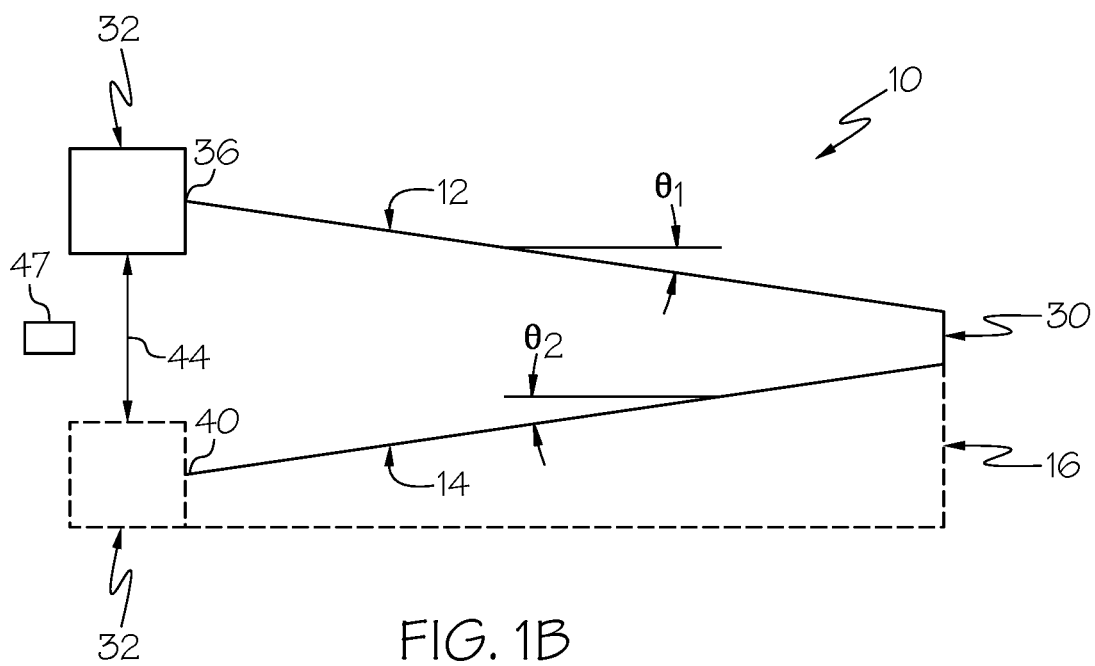
FIG. 1B is a diagrammatic side view of the flow rack assembly of FIG. 1A, according to one or more embodiments shown and described herein.

Referring to FIGS. 1A and 1B, a flow rack assembly 10 includes an upper supply track assembly 12 and a lower return track assembly 14. As shown, both the supply track assembly 12 and the return track assembly 14 may be linear; however, the supply track assembly and the return track assembly may include one or more curves or turns. A support structure 16 is provided that supports the supply track assembly 12 and the return track assembly 14 in their illustrated positions. In the illustrated example, the supply track assembly 12 declines at an angle $\theta_1$ to horizontal from a component preparation location 18 to a component pick location 20 and the return track assembly 14 declines at an angle $\theta_2$ to horizontal from the component pick location 20 to the component preparation location 18. In some embodiments, the angles $\theta_1$ and $\theta_2$ may different. In other embodiments, $\theta_1$ and $\theta_2$ may be the same. In either case, the angles $\theta_1$ and $\theta_2$ are selected to allow a component hanger 24 to move along the supply track assembly 12 with a component 26 thereon and to move along the return track assembly 14 without a component thereon after the component or components 26 are removed. A transition track assembly 30 is located between the supply track assembly 12 and the return track assembly 14. The transition track assembly 30 directs the empty component hangers 24 from the pick location 20 to the return track assembly 14 under the influence of gravity. Gravity is then used to deliver the empty component hanger 24 along the return track assembly 14 back to the component preparation location 18 to receive another component. A hanger transport device 32 moves between a pick-up position 34 at an end 36 of the return track assembly 14 and a release position 38 at an end 40 of the supply track assembly 12. The hanger transport device 32 includes a hanger support structure 42, such as rails, platforms, etc. that is used to receive an empty component hanger 24 from the return track assembly 14 and deliver the empty component hanger 24 to the supply track assembly 12. As will be described below, the hanger transport device 32 may be manually pulled along track 44 to the pick-up position 34 and locked into place. Once the hanger transport device 32 receives an empty component hanger 24, an operator may release the hanger transport device 32 (e.g., using foot pedal 45) to allow the hanger transport device 32 to return to the release position 38 (e.g., using a pneumatic device, such as a pneumatic spring or other suitable actuation device represented by element 47) where a component is placed on the component hanger 24. For example, the hanger transport device 32 may be biased toward the release position.

In some embodiments, the flow rack assembly 10 may be provided in a heated enclosure 50. The heated enclosure 50 may include an enclosed, heated portion 52 and an adjacent, unheated portion 54 that are separated by a wall 55. The supply track assembly 12 may extend through the heated portion 52 and the return track assembly 14 may extend through the unheated portion 54. The transition track assembly 30 may extend from the heated portion 52 to the unheated portion 54. In some embodiments, the heated portion 52 may be used to heat vehicle engine wire harnesses. The vehicle engine wire harnesses may become somewhat rigid at or below room temperature. The heated enclosure 50 can be used to heat the wire harnesses before they are installed in a vehicle in order to increase flexibility of the wire harnesses. The increased flexibility can help the installer when installing the wire harnesses in vehicles. After the heated wire harness is removed from the component hanger 24, the installer may step on a foot pedal 56 or other suitable actuation device, which releases the empty component hanger 24 to travel along the transition track assembly 30 under the force of gravity alone toward the return track assembly 14. The component hanger 24 then travels along the return track assembly 14 under the force of gravity back to the component preparation location 18 where the empty component hanger 24 is received by the hanger transport device 32 (shown by dashed lines). The operator may then step on the foot pedal 45 to release the hanger transport device 32 to travel along the track 44 where another wire harness is placed on the component hanger 24 and the process is repeated.

Figure 2:
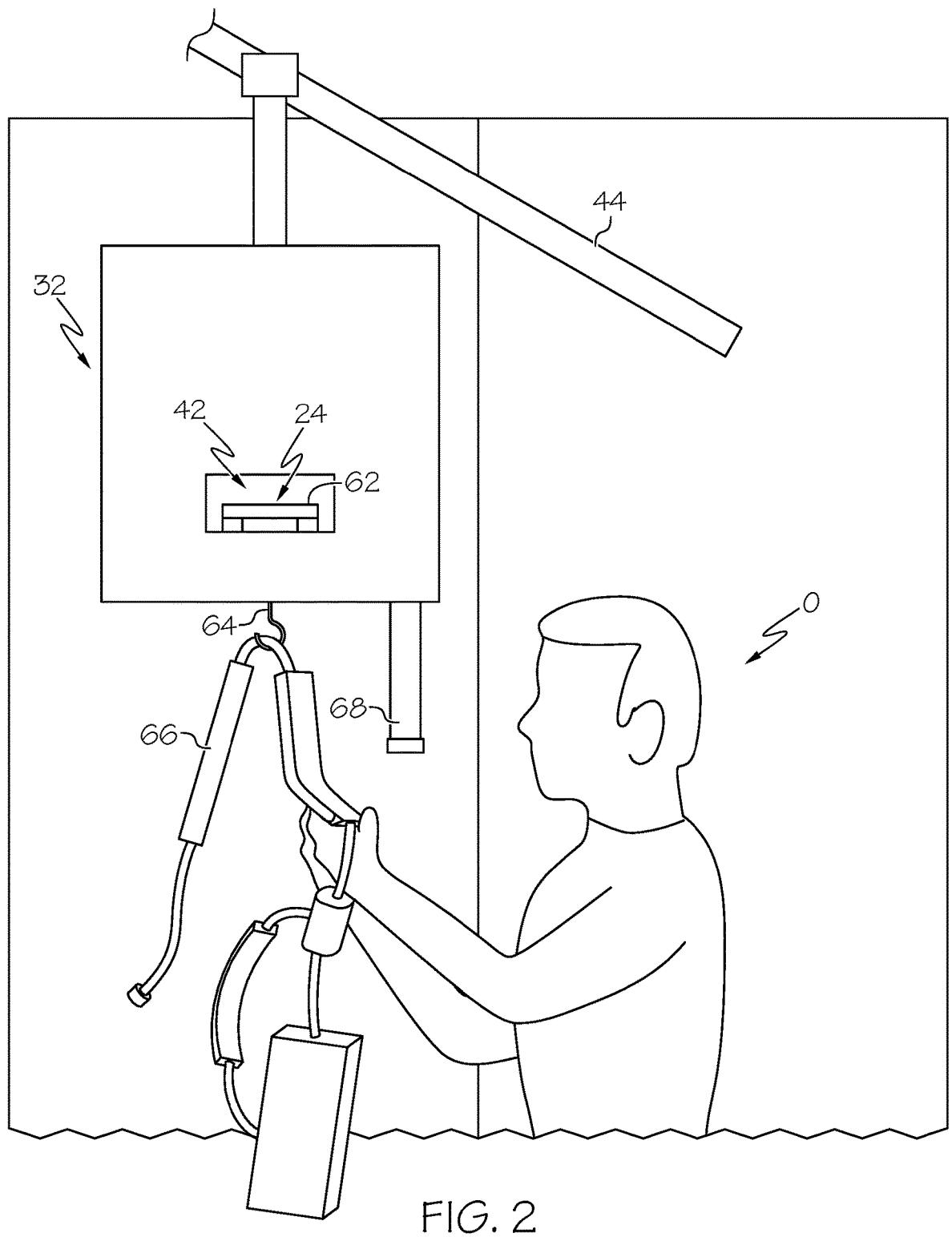
FIG. 2 is a diagrammatic view of a hanger transport device for use in the flow rack assembly of FIG. 1A, according to one or more embodiments shown and described herein.

Referring to FIG. 2, a diagrammatic view of the hanger transport device 32 is illustrated. The hanger transport device 32 includes the hanger support structure 42 that supports a base 62 of the component hanger 24 (see FIG. 6) such that a hook 64 extends downward from the hanger support structure 42 and is exposed below the hanger transport device 32 so that the operator O can hang a wire harness 66 therefrom. Once the wire harness 66 is hung from the hook 64, the operator can manually push the component hanger 24 with the wire harness 66 out of the hanger transport device 32 and along the supply track assembly 12 where the component hanger 24 and wire harness 66 are heated and received at the component pick location 20 (FIG. 1A).

Figure 3:
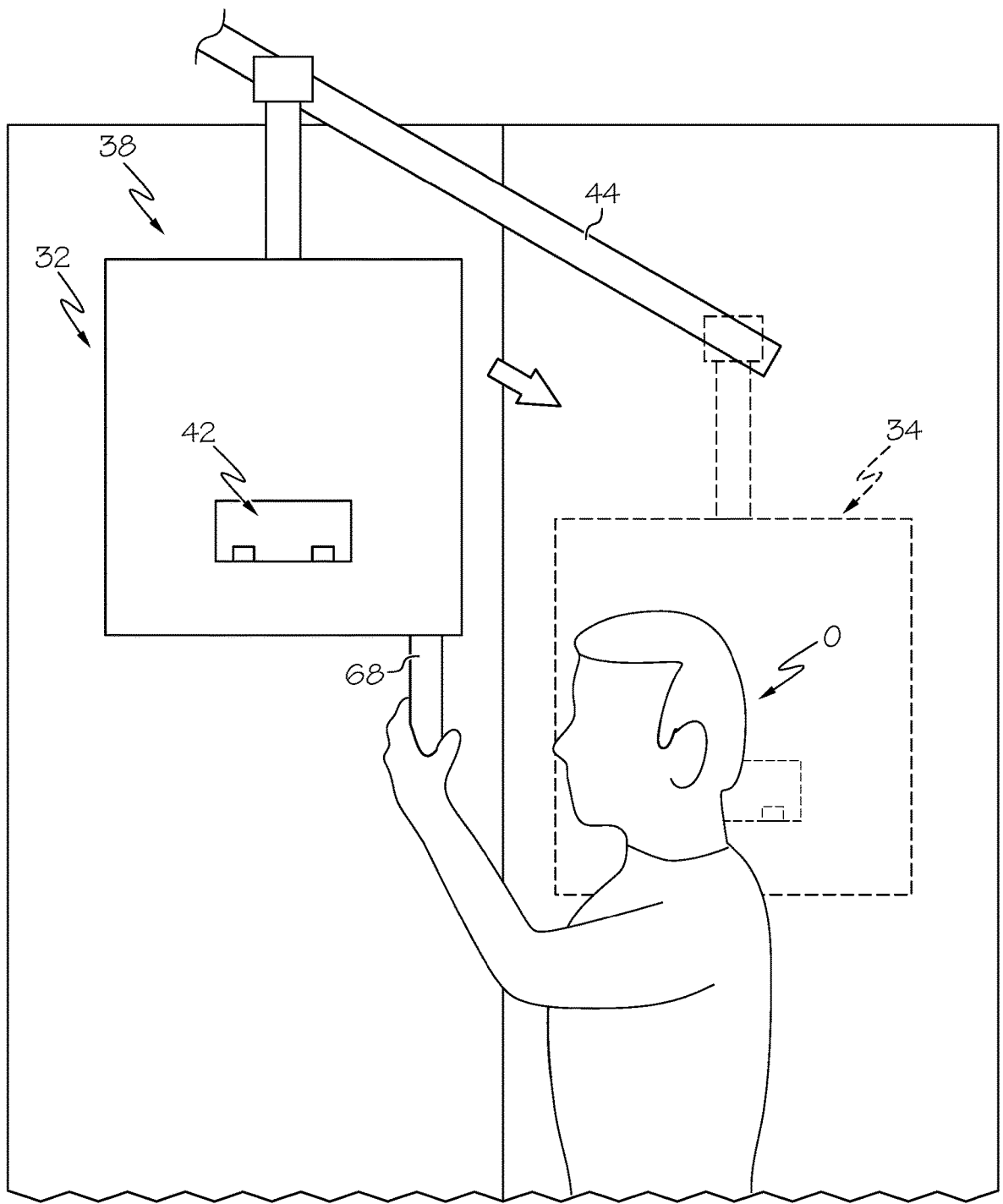
FIG. 3 is another diagrammatic view of the hanger support device of FIG. 2, according to one or more embodiments shown and described herein.

Referring also to FIG. 3, after the component hanger 24 and wire harness 66 are sent along the supply track assembly 12, the empty hanger transport device 32 may be grasped by the operator O using a handle 68 and pulled along the track 44 such that the hanger transport device 32 is moved from alignment with the supply track assembly 12 to alignment with the return track assembly 14 where the hanger transport device 32 is locked into place (e.g., by a latch or other suitable device). The hanger transport device 32 can then receive another empty component hanger 24 from the return track assembly 12 and the operator O can release the hanger transport device 32 to allow the hanger transport device 32 to return to the release position 38 (e.g., using a pneumatic device, such as a pneumatic spring or other suitable device) where another wire harness is placed on the component hanger 24.

Figure 4:
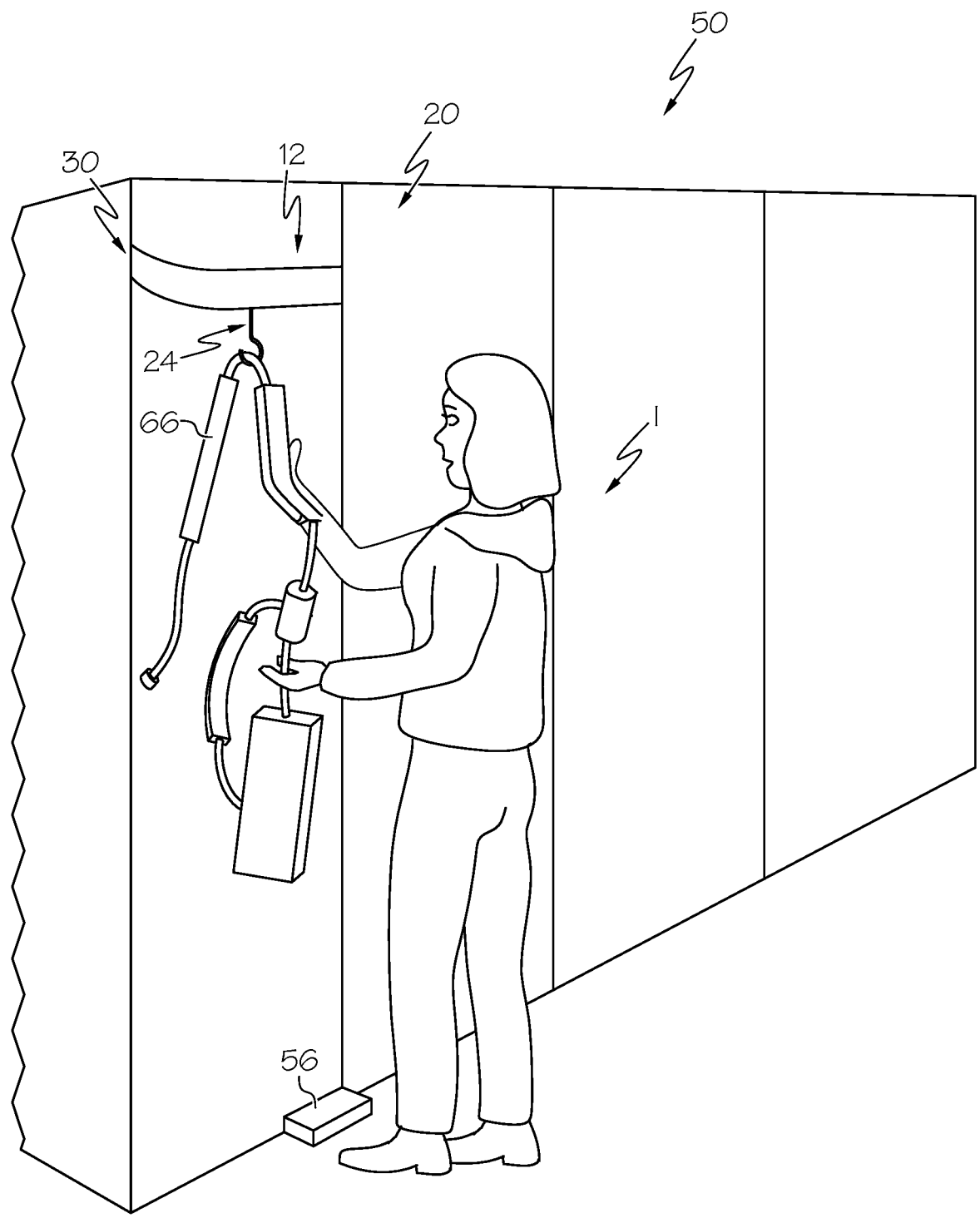
FIG. 4 is a diagrammatic view of a component pick location of the flow rack assembly of FIG. 1A, according to one or more embodiments shown and described herein.
Figure 5:
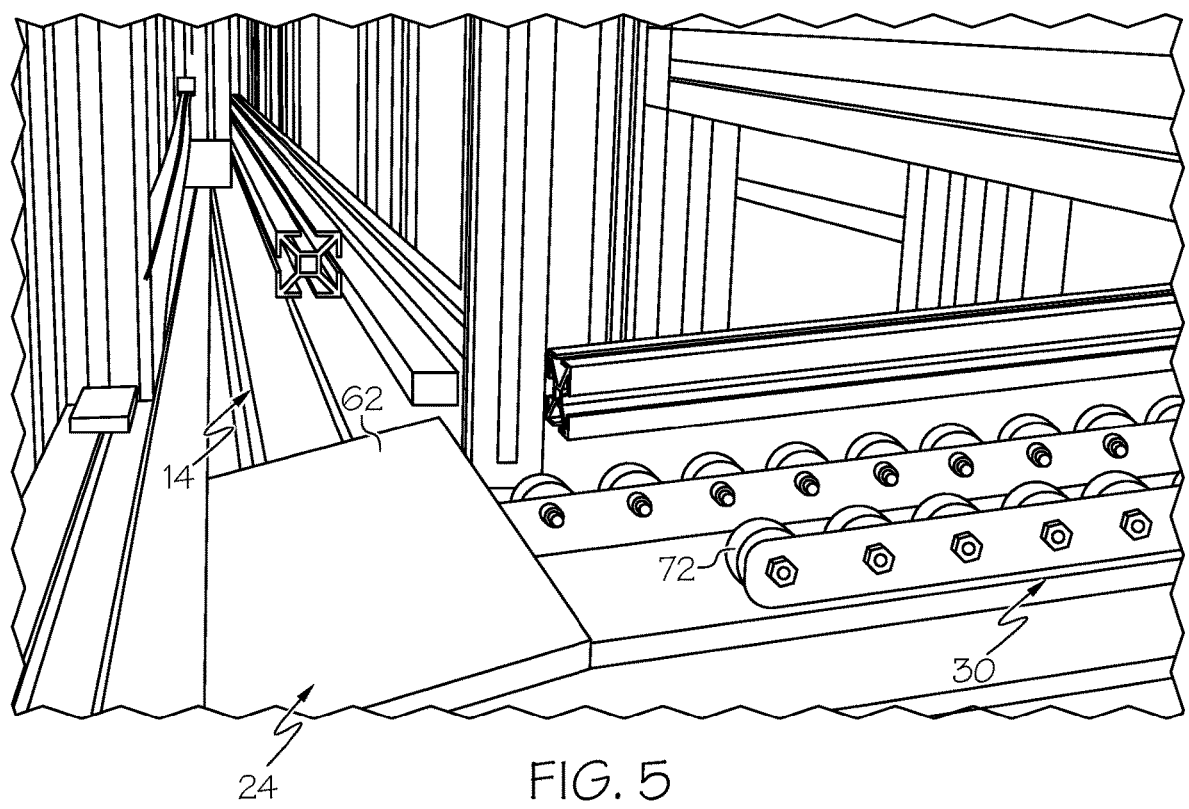
FIG. 5 is a diagrammatic view of a transition track assembly and a return track assembly of the flow rack assembly of FIG. 1A, according to one or more embodiments shown and described herein.
Figure 6:
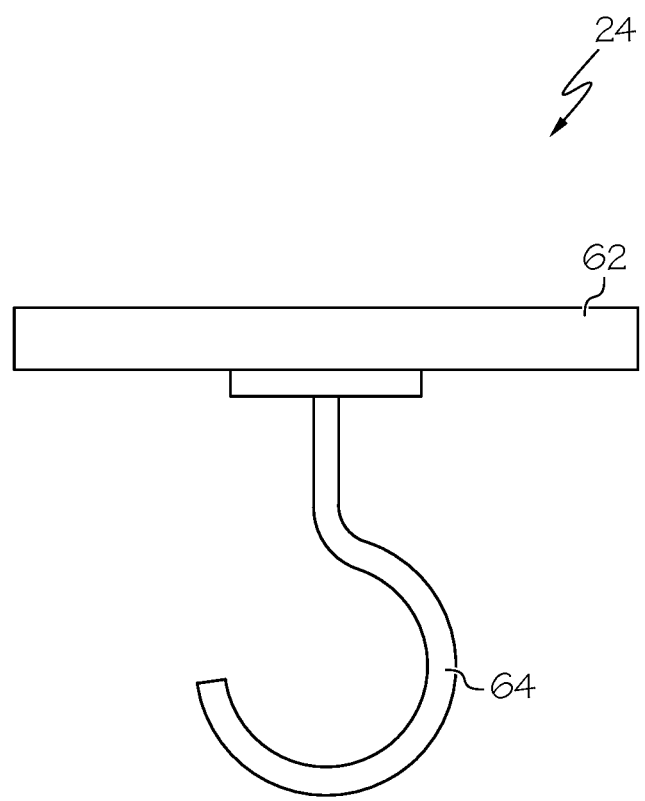
FIG. 6 is a diagrammatic view of a component hanger for use in the flow rack assembly of FIG. 1A, according to one or more embodiments shown and described herein.

Referring to FIG. 4, the component pick location 20 is illustrated where the installer I grasps the wire harness 66 and removes the wire harness 66 from the component hanger 24 for installation into a vehicle 70 (FIG. 1A). Once the wire harness 66 is removed from the component hanger 24, the foot pedal 56 can be actuated, which releases the locked component hanger 24 to travel along the transition track assembly 30. Referring to FIG. 5, the transition track assembly 30 (and the supply track and return track assemblies 12 and 14) may include rollers 72 that facilitate movement of the empty component hanger 24 along the track assemblies 30, 12 and 14. As can be seen by FIG. 5, the track assemblies 12, 14 and 30 support the base 62 of the component hanger 24 as the base 62 travels along the track assemblies 12, 14 and 30. FIG. 6 illustrates the component hanger 24 that includes the base 62 and the hook 64.

The above-described flow rack assemblies supply components to an assembly line without the use of electrical power. The flow rack assemblies utilize gravity to supply the components on component hangers. The flow rack assemblies include a supply track assembly and a return track assembly with a transition track assembly therebetween. A flow control system utilizing the foot pedals at the component preparation and component pick locations is provided that can be used to control movement of the component hangers through the flow rack assembly and facilitate continuous supply of components to the component pick location in a reliable fashion.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Directional terms used herein—for example widthwise, lengthwise, vertical, up, down, right, left, front, back, top, bottom, upper, lower—are made only to supply directional context.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of transporting a vehicle engine wire harness from a component preparation location to a component pick location, the method comprising:
   placing the vehicle engine wire harness on a hook of a component hanger of a flow rack assembly, the flow rack assembly comprising:
      a supply track assembly that extends from a component preparation location to a component pick location;
      a transition track assembly that extends from the supply track assembly to a return track assembly, the return track assembly extends from the transition track assembly to the supply location declining in elevation such that the component hanger travels along the return track assembly due to gravity; and
      a hanger transport device that moves along a track between ends of the supply track assembly and the return track assembly at the component preparation location, the hanger transport device comprising a hanger support structure configured to receive the component hanger from the return track assembly at a pick-up position and transport the component hanger to the supply track assembly at a release position; and
   directing the component hanger with vehicle engine wire harness along the supply track assembly extending through a heated enclosure to the component pick location at a vehicle assembly line.

2. The method of claim 1 further comprising:
   directing the component hanger with the vehicle engine wire harness removed along the transition track assembly from the component pick location to the return track assembly; and
   directing the component hanger with the vehicle wire harness removed along the return track assembly to the component preparation location.

3. The method of claim 2, wherein the return track assembly declines in elevation from the transition track assembly to the component preparation location such that the component hanger travels due to gravity.

4. The method of claim 3 further comprising transporting the component hanger from the return track assembly to the supply track assembly using the hanger transport device, the hanger transport device moving along the track between ends of the supply track assembly and the return track assembly at the component preparation location.

5. A flow rack assembly comprising:
   a supply track assembly that extends from a component preparation location to a component pick location;
   a transition track assembly that extends from the supply track assembly to a return track assembly, the return track assembly extends from the transition track assembly to the supply location declining in elevation such that a component hanger travels along the return track assembly due to gravity; and
   a hanger transport device that moves along a track between ends of the supply track assembly and the return track assembly at the component preparation location, the hanger transport device comprising a hanger support structure configured to receive the component hanger from the return track assembly at a pick-up position and transport the component hanger to the supply track assembly at a release position;
   wherein the supply track assembly extends through a heated enclosure.

6. The flow rack assembly of claim 5, wherein the hanger transport device is biased toward the release position.

7. The flow rack assembly of claim 6, wherein the hanger transport device comprises a handle that is manually grasped by an operator and the hanger transport device is manually pulled along the track to the pick-up position.

8. The flow rack assembly of claim 5, wherein one or both of the supply track assembly and the transition track assembly decline in elevation such that the component hanger travels therealong under gravity.

9. The flow rack assembly of claim 5, wherein the component hanger comprises a base and a hook that extends from the base, the base supported by the supply track assembly, transition track assembly and return track assembly.

10. A flow rack assembly comprising:
    a supply track assembly that extends through a heated enclosure from a component preparation location to a component pick location; and
    a transition track assembly that extends from the supply track assembly to a return track assembly located outside the heated enclosure, the return track assembly extends from the transition track assembly to the component preparation location declining in elevation such that a component hanger travels along the return track assembly due to gravity.

11. The flow rack assembly of claim 10 further comprising a hanger transport device that moves along a track between ends of the supply track assembly and the return track assembly at the component preparation location, the hanger transport device comprising a hanger support structure configured to receive the component hanger from the return track assembly at a pick-up position and transport the component hanger to the supply track assembly at a release position.

12. The flow rack assembly of claim 11, wherein the hanger transport device is biased toward the release position.

13. The flow rack assembly of claim 12, wherein the hanger transport device comprises a handle that is manually grasped by an operator and the hanger transport device is manually pulled along the track to the pick-up position.

14. The flow rack assembly of claim 10, wherein one or both of the supply track assembly and the transition track assembly decline in elevation such that the component hanger travels therealong under gravity.

15. The flow rack assembly of claim 10, wherein the component hanger comprises a base and a hook that extends from the base, the base supported by the supply track assembly, transition track assembly and return track assembly.

* * * * *